J. ACKERLAND.
WINDSHIELD SHADE.
APPLICATION FILED JULY 2, 1920.
1,378,510.
Patented May 17, 1921.
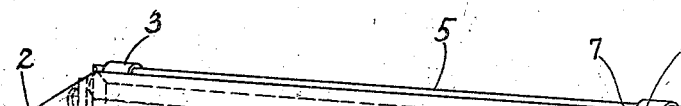

UNITED STATES PATENT OFFICE.

JOSEPH ACKERLAND, OF MINNEAPOLIS, MINNESOTA, ASSIGNOR TO GEORGE M. SEEMANN, OF MINNEAPOLIS, MINNESOTA.

WINDSHIELD-SHADE.

1,378,510. Specification of Letters Patent. Patented May 17, 1921.

Application filed July 2, 1920. Serial No. 393,546.

*To all whom it may concern:*

Be it known that I, JOSEPH ACKERLAND, a citizen of the United States, resident of Minneapolis, Hennepin county, State of Minnesota, have invented certain new and useful Improvements in Windshield-Shades, of which the following is a specification.

This invention relates to an improved wind-shield shade or awning adapted for use in connection with automobiles or similar vehicles, to prevent the passage of certain intense direct rays of light through the wind-shield, and to prevent ice, rain and snow from being driven against, and from accumulating upon, the glass. The purpose of this structure is broadly the same as that of the construction disclosed in the prior and co-pending application of the inventor hereof, Serial Number 373,620, filed April 13, 1920. This structure is similarly particularly useful in driving an automobile in the direction of the sun, as for example; when the evening or morning sun is low in the sky. The direct rays of the sun in such position interfere with the clear vision of the vehicle operative and this shade or awning is adapted to be adjustably lowered to shade the operative's eyes from these direct rays.

The object, therefore, of this invention is to provide an improved wind-shield shade.

Other objects of the invention will more fully appear from the following description and accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 1 is a perspective view of the novel shade as applied to the usual automobile wind-shield;

Fig. 2 is a partial section of the frame-operating means;

Fig. 3 is a fragmentary view showing the installation on an automobile having a closed-car body;

Fig. 4 is a section on the line 4—4 of Fig. 2.

Heretofore, automobiles have been provided with spring-actuated shade rollers mounted adjacent the wind-shield tops and a flexible shade is tensionably rolled up on the roller. Various spring-devices, catches, and cords have been provided to effect the unrolling of the shade and its maintenance in the desired position. The invention herein particularly resides in the novel structure whereby the shade-carrying member may be moved to and maintained in any of a plurality of desired positions. In this preferred construction embodying the invention, there is provided a spring-actuated shade-roller 1 which is of the common type and is not necessary to be shown or described in detail. A flexible shade 2 is adapted to be wound thereon under tension of the roller spring. One end portion of the shade is secured to the roller in accordance with common practice while the other end portion of the shade is secured to a member such as a substantially U-shaped frame. While the shade-roller here shown is mounted adjacent the top of the wind-shield, it is obvious that the roller may be mounted on the frame and the other end portion of the shade secured to the wind-shield top. However, it is preferable in practice to mount the roller adjacent the wind-shield top and it is here shown as held in two brackets 3 secured by the set screws 4 to the cross-bar 5 of the wind-shield 6. One pivot of the roller, in accordance with the common practice in wind shade rollers, is held against rotation by means of the angular socket 7 formed in a portion of the bracket 3.

The frame member is preferably pivotally mounted adjacent the wind-shield and is adapted to stretch the shade in forwardly extended position across the wind-shield as the shade is unrolled by movement of the pivoted frame member. A pair of brackets 8, are mounted adjacent the wind-shield, one on each side thereof and thus provide the bearing supports for the two arms of the U-shaped frame member. As here disclosed, these brackets 8 are secured to the wind-shield supports 9 by means of U-bolts 10. The brackets and frame-operating mechanism are similar and, therefore, it is necessary to describe but one. Obviously, too, but one operating-mechanism need be employed but it is deemed preferable to employ the two, as shown, as better results are attained.

The bracket 8, which provides the bearing support for an arm 11 of the frame member, is mounted to project forwardly of the windshield and is preferably forked to receive the lower terminal portion of the arm 11 which is apertured to receive therethrough the pivot pin 12 mounted in the two fork portions of the bracket. The arm 11 is therefore pivotally borne by the bracket 8.

Gear toothed means are provided in this novel construction to rock the arm of the frame member about its pivot. In the preferred form, this consists in the provision of a worm sector on the terminal portion of the arm and of a worm gear to actuate the sector. The peripheral gear teeth 13 on the worm sector 14 are substantially concentrically disposed with relation to the pivotal mounting on the pin 12 of the sector. As the total arcuate travel of the frame member is not more than ninety degrees the teeth 13 need not extend around the sector, nor, need the sector be circular. As here shown, the unnecessary sector portion is cut away or omitted in the casting.

The worm gear 15, which meshes with and is operable to actuate the arm sector, is provided on the frame terminal portion of a movably mounted element such as a rod 16 mounted to rotate in an aperture longitudinally provided in the bracket 8. The worm gear 15 is provided by its forked forward portion. The rod 16, rearwardly extending through the bracket is provided with a wing nut 17, fast thereon, by which means the rod 16 may be normally rotated by the driver of the vehicle to adjust the shade. In this construction the friction of the engagement of the worm gear 15 effects the maintenance of the shade in any desired unrolled position against the tension of the spring-actuated shade-roller.

A slight modification of this device is shown in Fig. 3 wherein the bracket 8 is shown as provided with a rear flange 18 adapted to be secured to the exterior of the body of a sedan or similar body of the so-called closed-car type. The angled flange 18 may be screwed, as shown, to the body portion 19 adjacent the wind-shield. The advantage of this novel, single-rod construction is particularly shown in this close car adaption as but a single aperture need be bored through the car body.

In this improved shade structure, provision is made for longitudinal adjustment of the arms 11 of the frame member. This present adjustment permits adaption of this novel device to vehicles having different heights of wind-shields. One such adjustment is provided in each frame arm 11 and is shown in detail in Fig. 2 wherein the arm 11 is shown as comprising two sections, an upper 20 and a lower 21. The upper section 20 is tubular and is adapted to receive telescopically therein the upper end portion of the lower section 12.

The lower portion 22 of the upper section 20 is split, downwardly tapered and externally threaded and is received in threaded engagement in the internally threaded and upwardly tapered nut 23. Therefore, when the internally tapered nut 23 is turned on the portion 22 and upwardly rides the tapered, threaded and split surface, the portion 22 of the upper section is contracted and internally grips the telescoped rod and frictionally holds the same in adjusted position.

Having thus described my invention, what I claim as new and desire to secure by Letters-Patent is:

1. In a wind-shield, a flexible shade, a spring-actuated shade-roller having one end of the shade secured thereto and normally tending to wind the shade thereon, means operatively to mount the roller adjacent the top of the wind-shield, a member connected to said shade near its opposite end to stretch the shade in forwardly extended position across the wind-shield as the shade is unrolled, a pivotal mounting for said member adjacent said wind-shield, said mounting comprising a bifurcated bracket, a worm extending longitudinally through the bracket and into the bifurcation, means on said worm, whereby it may be manually operated, and coöperable gear teeth on said member and worm whereby the member may be moved to a plurality of shade-extending positions.

2. In a wind-shield, a flexible shade, a spring-actuated shade-roller having one end of the shade secured thereto and normally tending to wind the shade thereon, means operatively to mount the roller adjacent the top of the wind-shield, a member connected to said shade near its opposite end to stretch the shade in forwardly extended position across the wind-shield as the shade is unrolled, a pivotal mounting for said member adjacent said wind-shield, said mounting comprising a bifurcated bracket attached to the side of the wind shield, a plurality of gear teeth provided on said member adjacent said pivotal mounting, a worm extending longitudinally of said bracket and rotatably mounted therein, coöperable teeth on the member and worm, means on the inner portion of the worm whereby the same may be manually rotated, whereby the member may be moved to and maintained in a plurality of shade-extending positions.

3. In a wind-shield, a flexible shade, a spring-actuated shade-roller having a fixed pivot, said shade roller having one end of the shade secured thereto and normally tending to wind the shade thereon, detachable brackets having ends fitted over the top of the wind shield and in which the roller pivot is held, a member connected to said shade near its opposite end to stretch the shade in forwardly extended position across the wind-shield as the shade is unrolled, a bearing support for said member adapted to project forwardly of the windshield and shaped pivotally to bear the terminal portion of said member, an element movably borne by said support and forwardly terminating adjacent said pivotal bearing, means on said member and element adjacent said pivotal bearing coöperable, upon movement of said element, to move the member to and maintain the same in a plurality of shade-extending positions.

In witness whereof I have hereunto set my hand this 29th day of June, 1920.

JOSEPH ACKERLAND.